US009489456B1

(12) United States Patent
Vidwans

(10) Patent No.: US 9,489,456 B1
(45) Date of Patent: Nov. 8, 2016

(54) PREVIEWING FILE INFORMATION OVER A NETWORK

(75) Inventor: Hrishikesh A. Vidwans, Edison, NJ (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 318 days.

(21) Appl. No.: 11/561,123

(22) Filed: Nov. 17, 2006

(51) Int. Cl.
G06F 17/30 (2006.01)

(52) U.S. Cl.
CPC ................ G06F 17/30864 (2013.01)

(58) Field of Classification Search
CPC .................. G06F 17/30864; G06F 17/30867; G06F 17/30067
USPC ........... 707/2, 705, 736, 737, 741, 748, 754, 707/999.01; 370/392, 400, 408; 711/137
See application file for complete search history.

(56) References Cited

U.S. PATENT DOCUMENTS

| 7,103,617 | B2 | 9/2006 | Phatak | |
|---|---|---|---|---|
| 2002/0168621 | A1* | 11/2002 | Cook et al. | 434/350 |
| 2003/0009538 | A1* | 1/2003 | Shah et al. | 709/219 |
| 2003/0026254 | A1* | 2/2003 | Sim | 370/392 |
| 2003/0097443 | A1* | 5/2003 | Gillett et al. | 709/225 |
| 2005/0071601 | A1* | 3/2005 | Luick | 711/206 |
| 2005/0240940 | A1* | 10/2005 | Quinet et al. | 719/315 |
| 2006/0010150 | A1* | 1/2006 | Shaath et al. | 707/102 |
| 2007/0156967 | A1* | 7/2007 | Bond et al. | 711/137 |
| 2008/0126828 | A1* | 5/2008 | Girouard et al. | 714/2 |

OTHER PUBLICATIONS

Vinodh Dorairajan, *Enabling File Sharing over the WAN*, Comms Design (May 25, 2004) http://www.commsdesign.com/article/printableArticle.jhtml;jsessionid=M5QJRBH3AU2EMQSNDLRCKHS-CJUNN2JVN?articleID=21100084).
http://www.microsoft.com/downloads/details.aspx?FamilyID=ac57de32-17f0-4b46-9e4e-467ef9bc5540&displaylang=en, Apr. 2004.

* cited by examiner

Primary Examiner — Syling Yen
(74) Attorney, Agent, or Firm — Baker Botts L.L.P.

(57) ABSTRACT

A process for opening and reading a file over a network, including a WAN. An edge file gateway receives a request from an application to open a file cached with the edge file gateway at one point on a network and stored on a file server connected to a central server at another point on the network. The edge file gateway forwards the request to open the file to the central server, along with any offsets and lengths stored from any previous requests to read the file. The central server responds by sending any file data described in the offsets and lengths to the edge file gateway. When the edge file gateway receives a read request, the edge file gateway stores the offset and length for the request, if a predefined storage limit is not exceeded, and attempts to satisfy the request from cached file data.

21 Claims, 10 Drawing Sheets

PREVIEWING FILE INFORMATION OVER A NETWORK

TECHNICAL FIELD

The present disclosure relates to file sharing and file access over networks.

BACKGROUND OF THE INVENTION

While workers can easily share gigabytes of project data on a local-area network (LAN) using standard file-server technology, such is not the case with workers in remote offices connected over wide-area networks (WANs). With respect to file sharing over WANs, standard file server protocols provide unacceptably slow response times when opening and writing files.

All major file-sharing protocols were designed for LAN environments where clients and servers are located in the same building or campus, including: NFS (Network File System, used for Unix/Linux environments), CIFS (Common Internet File System used for Windows environments), and IPX/SPX (Internetwork Packet Exchange/Sequenced Packet Exchange, used for Novell environments). The assumption that the client and the server would be in close proximity led to a number of design decisions that do not scale across WANs. For example, these file sharing protocols tend to be rather "chatty", insofar as they send many remote procedure calls (RPCs) across the network to perform operations.

For certain operations on a file system using the NFS protocol (such as an rsync of a source code tree), almost 80% of the RPCs sent across the network can be access RPCs, while the actual read and write RPCs typically comprise only 8-10% of the RPCs. Thus 80% of the work done by the protocol is simply spent trying to determine if the NFS client has the proper permissions to access a particular file on the NFS server, rather than actually moving data.

In a LAN environment, these RPCs do not degrade performance significantly given the usual abundance of bandwidth, but they do in WANs, because of their high latency. Furthermore, because data movement RPCs make up such a small percentage of the communications, increasing network bandwidth will not help to alleviate the performance problem in WANs.

Therefore, systems have been developed (called wide area file services (WAFS)) which combine distributed file systems with caching technology to allow real-time, read-write access to shared file storage from any location, including locations on WANs, while also providing interoperability with standard file sharing protocols such as NFS and CIFS. See, for example, U.S. Pat. No. 7,103,617.

WAFS systems typically consist of edge file gateway (EFG) appliances (or servers), which are placed at remote offices, and one or more central server (CS) appliances (or servers) that allow storage resources to be accessed by the EFG appliances. Each EFG appliance appears as a local fileserver to remote office users. Together, the EFG appliances and CS appliance implement a distributed file system and communicate using a WAN-optimized protocol. This protocol is translated back and forth to NFS and CIFS at either end, to communicate with the remote user applications and the centralized storage.

The WAN-optimized protocol typically includes file-aware differencing technology, data compression, streaming, and other technologies designed to enhance performance and efficiency in moving data across the WAN. File-aware differencing technology detects which parts of a file have changed and only moves those parts across the WAN. Furthermore, if pieces of a file have been rearranged, only offset information will be sent, rather than the data itself.

In WAFS systems, performance during "read" operations is usually governed by the ability of the EFG appliance to cache files at the remote office and the ability to serve cached data to users while minimizing the overhead of expensive kernel-user communication and context switches, in effect enabling the cache to act just like a high-performance file server. Typically, the remote cache attempts to mirror the data center exactly, so that "read" requests will be satisfied from the local cache with only a few WAN round trips required to check credentials and availability of file updates.

In WAFS systems, "write" operations should maintain data coherency, i.e., file updates ("writes") from any one remote office should not to conflict with updates from another remote office. To achieve data coherency, some WAFS systems use file leases. Leases define particular access privileges to a file from a remote office. If a user at a remote office wants to write to a cached file, the EFG appliance at that office obtains a "write lease", i.e., a right to modify the document before it can do so. The WAFS system ensures that at any time there will be only one remote office that has the write lease on a particular file. Also, when a user at another office tries to open the file, the EFG appliance that has the write lease flushes its data first and optionally can give up the write lease if there are no active writers to the file. See generally, Enabling File Sharing over the WAN, Comms Design (May 25, 2004), by Vinodh Dorairajan.

One of the applications that might make use of a WAFS system is a file manager, such as Windows Explorer. A file manager is a computer program that provides a user interface to work with file systems. Often, a file manager is part of an operating system. For desktop computers at the present time, the most common type of file manager is a navigational, as opposed to spatial, file manager.

A navigational file manager is a file manager that uses a "navigational" metaphor to represent file system locations. The user can change the location being viewed, by opening folders, pressing a back button, typing a location, etc. Typically, icons represent files, applications, and directories. The interface in a navigational file manager may strongly resemble a web browser, complete with back, forward, and maybe even reload buttons, and an address bar where file locations can be typed and the current location is shown. Moving from one location to another does not require the opening of a new window, which is the case with spatial file managers.

The most common operations that file managers perform on files are create, open, edit, view, print, play, rename, move, copy, delete, attributes, properties, search/find, and permissions. Often a file manager displays files, using a hierarchy, with some information such as author and modification date that the file manager reads from the beginning of the file, e.g., the file header. Some media file formats do not include traditional file headers, e.g., MP3 audio files consisting of frames, though file headers are common among file formats used by word-processing programs. In this regard, see the Microsoft Office Word 2003 Rich Text Format (RTF) Specification (Version 1.8, April 2004), which describes a file header in a human-readable file format.

Other file formats provide for the storing of preview information in the form of a thumbnail, i.e., a version of an image that has been reduced in size. For example, the file format for Windows Media Photo files includes a thumbnail section, as does the file format for AutoCAD DXF files.

Many file managers read such sections and display their preview information, e.g., thumbnails, when displaying the files in a hierarchy.

SUMMARY

In particular embodiments, the present invention provides methods, apparatuses, and systems directed to facilitating operation of file managers in connection with wide area file systems. In one particular embodiment, the present invention facilitates various file accesses generated by file managers, such as previewing file information from file data cached at one point on a network and stored in a server at another point on the network.

DESCRIPTION OF EXAMPLE EMBODIMENT(S)

The following example embodiments are described and illustrated in conjunction with apparatuses, methods, and systems which are meant to be examples and illustrative, not limiting in scope.

A. Network Environment

Figure 1:
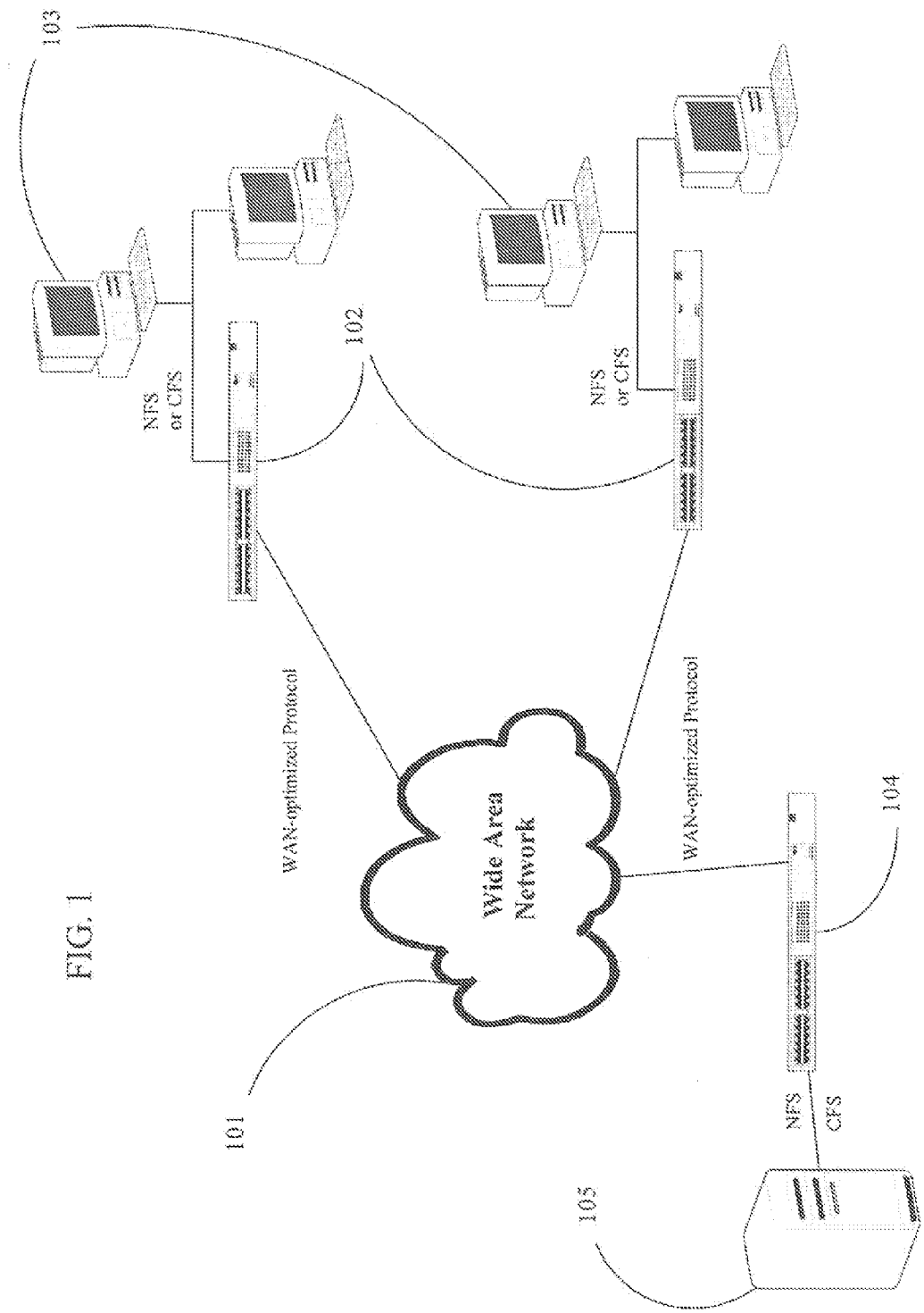
FIG. 1 is a block diagram showing, at a high level, an example computer network environment in which embodiments of the present invention might operate.

As discussed in the background above, WAFS systems often include one or more EFG appliances (or servers), which are placed at remote offices, and one or more CS appliances (or servers) that allow storage resources to be accessed by the EFG appliances. FIG. 1 shows at a high level such an arrangement, which might be used with an embodiment of the present invention. In particular, FIG. 1 shows a WAN 101 connecting a CS appliance 104 to two EFG appliances 102. In turn, the CS appliance 104 is connected, via a LAN or other network, to a file server 105 and the EFG appliances 102 are connected, again via a LAN or other network, to workstations 103.

In particular embodiments, the CS appliance 104 and the EFG appliances 102 communicate over the WAN 101 using a WAN-optimized protocol. However, this is probably not true of the communication between the CS appliance 104 and the file server 105, which communication typically uses a protocol such as CFS or NFS. Likewise a protocol such as CFS or NFS is typically used for communication between EFG appliances 102 and the workstations 103.

Figure 2:
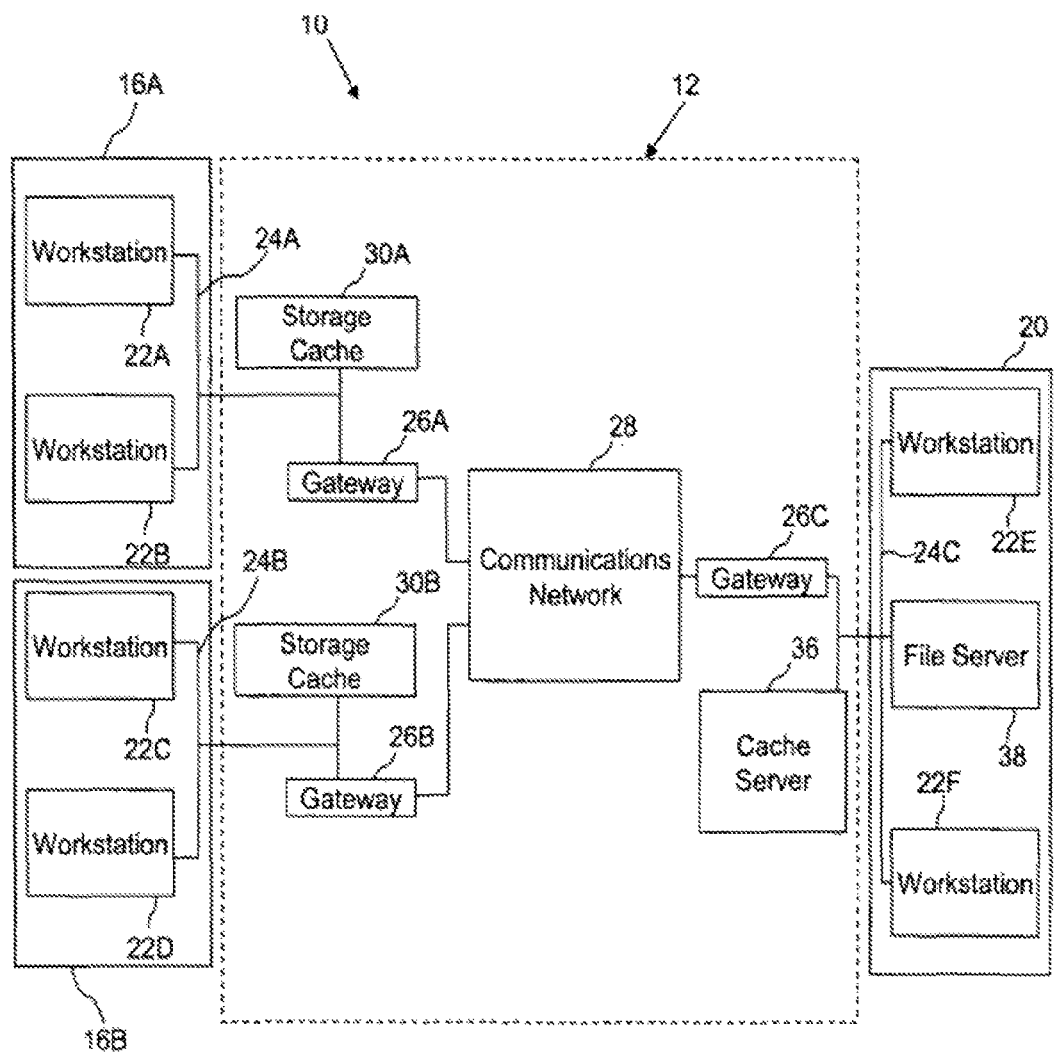
FIG. 2 is a block diagram showing, at a lower level, an example computer network environment in which embodiments of the present invention might operate.

FIG. 2 is a block diagram showing, at a lower level, an example computer network environment in which embodiments of the present invention might operate. The network 10 includes a storage-caching protocol system 12 that interfaces with a distributed file system application operating at a data center computer system, which is a repository for data files, and a remote site computer system, which normally is located remotely from a data center system and is associated with a computer workstation that desires to access, i.e., view only (read) or modify (write), data files stored at a file server of a data center system. The storage-caching protocol system 12 includes at least one EFG appliance (here referred to as a "storage cache"), which is coupled to a workstation of an associated remote system, and at least one CS appliance (here referred to as a "cache server"), which is coupled to a file server of a data center system, where the storage cache and the cache server utilize a communications link, such as a link established over the Internet, to transfer (i) copies of data files that the associated workstation desires to access, (ii) file update data representative of on any data file modifications entered by authorized workstations that access the data file, and (iii) data associated with the operating features of the storage caching protocol system 12.

In the embodiment of the storage caching protocol system 12 in the illustrative network 10 shown in FIG. 2, the system 12 interfaces with remote work group computer systems 16A and 16B and a central work group data center computer system 20. The remote system 16A includes computer workstations 22A and 22B interconnected over a communications channel 24A, such as an Ethernet or like medium. Similarly, the remote system 16B includes computer workstations 22C and 22D interconnected over a communications channel 24B. Each of the workstations 22 is part of or constitutes, for example, a personal computer, a personal digital assistant, or other like electronic device including a processor and memory and having communications capabilities. In addition, the workstations of a remote system, in combination with the Ethernet, form a LAN and operate in accordance with a conventional distributed file system, such as NFS or CIFS, which provides that a user of a workstation can access data files located remotely from the remote system in which the workstation is contained.

A communications gateway 26 couples the Ethernet 24 of each of the remote systems 16 to a communications network 28. The network 28, for example, can be a WAN, LAN, the Internet or any like means for providing data communications links between geographically disparate locations. The gateway 26, for example, is a standard VPN Internet connection having standard DSL speeds. The gateway 26 enables data, such as data files accessible in accordance with a distributed file system such as NFS or CIFS, to be transferred between a workstation and a remotely located file server.

Referring again to FIG. 2, the storage caching system 12 includes storage caches 30A and 30B which are associated with the remote systems 16A and 161B, respectively. Each storage cache 30 is coupled to the Ethernet 24 and the gateway 26 of the associated remote system 16. In addition, the storage caching system 12 includes a cache server 36. The cache server 36 is coupled to an associated gateway 26C which is also coupled to the network 28. An Ethernet 24C couples the gateway 26C and the cache server 36 to a file server 38 and workstations 22D and 22E contained in the data center system 20. The file server 38 is a conventional file storage device, such as a NAS (Network Attached Storage), which is a repository for data files and provides for distribution of stored data files to authorized workstations in accordance with the operation of conventional distributed file systems, such as NFS or CIFS, which are implemented at the authorized workstations of the remote systems 16 and the data center 20. For purposes of illustration, it is assumed that all of the workstations 22 in the remote systems 16 and in the data center 20 constitute authorized workstations and operate in accordance with a distributed file system compatible with that of the server 38.

Figure 3:
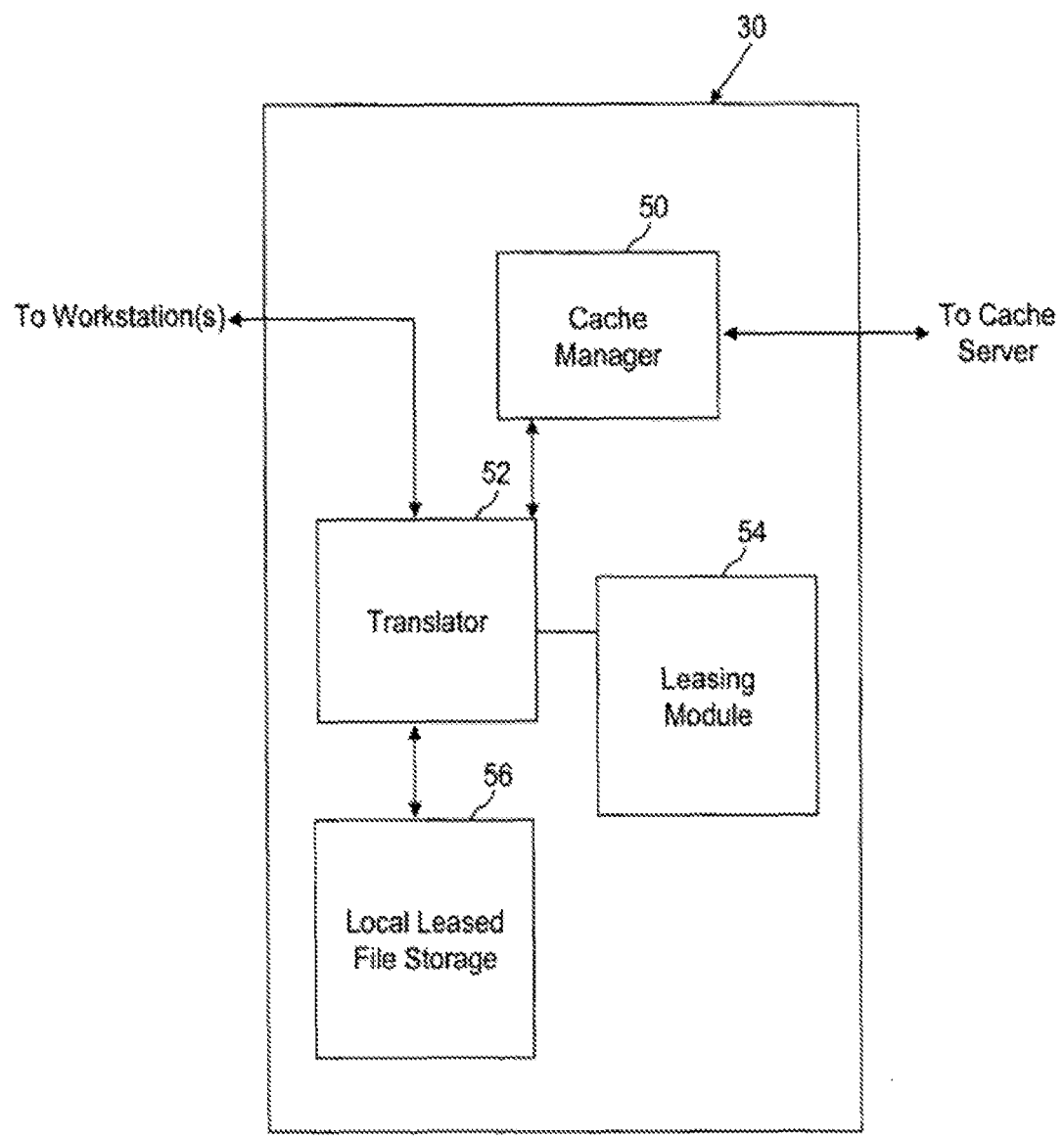
FIG. 3 is a block diagram showing the functional components of an EFG appliance (or server), which might be used in some embodiments of the present invention.

FIG. 3 is a particular embodiment of a storage cache (or EFG appliance), in accordance with the present invention. Referring to FIG. 3, the storage cache 30 includes the modules of a cache manager 50, a translator 52, a leasing module 54, and a local leased file storage 56. The cache manager 50 is coupled to the translator 52 and is coupled to a cache server, such as the cache server 36 as shown in FIG. 2, via gateways and a communications network. The translator 52 is coupled to the leasing module 54 and the local storage 56, and is coupled to workstations of an associated remote system via an Ethernet connection.

The cache manager 50 controls routing of data files, file update data, and data file leasing information to and from the cache server 36. The translator 52 stores copies of accessed data files at the storage 56 as a cached data file, makes the cached data file available for reading or writing purposes to an associated workstation that requested access to a data file corresponding to the cached data file, and updates the cached data file based on data file modifications entered by the workstation or update data supplied from the cache server. In addition, the translator 52 can generate a checksum representative of a first data file and determine the difference between another data file and the first data file based on the checksum using techniques that are well known. The leasing module 54, through interactions with the cache server 36, determines whether to grant a request for access to a data file from an associated workstation, where the access request requires that the cached data file is made available to the associated workstation either for read or write purposes. In an embodiment, a storage cache is associated with every remote computer system that can access a data file stored at a file server of a data center system over the network 28.

Figure 4:
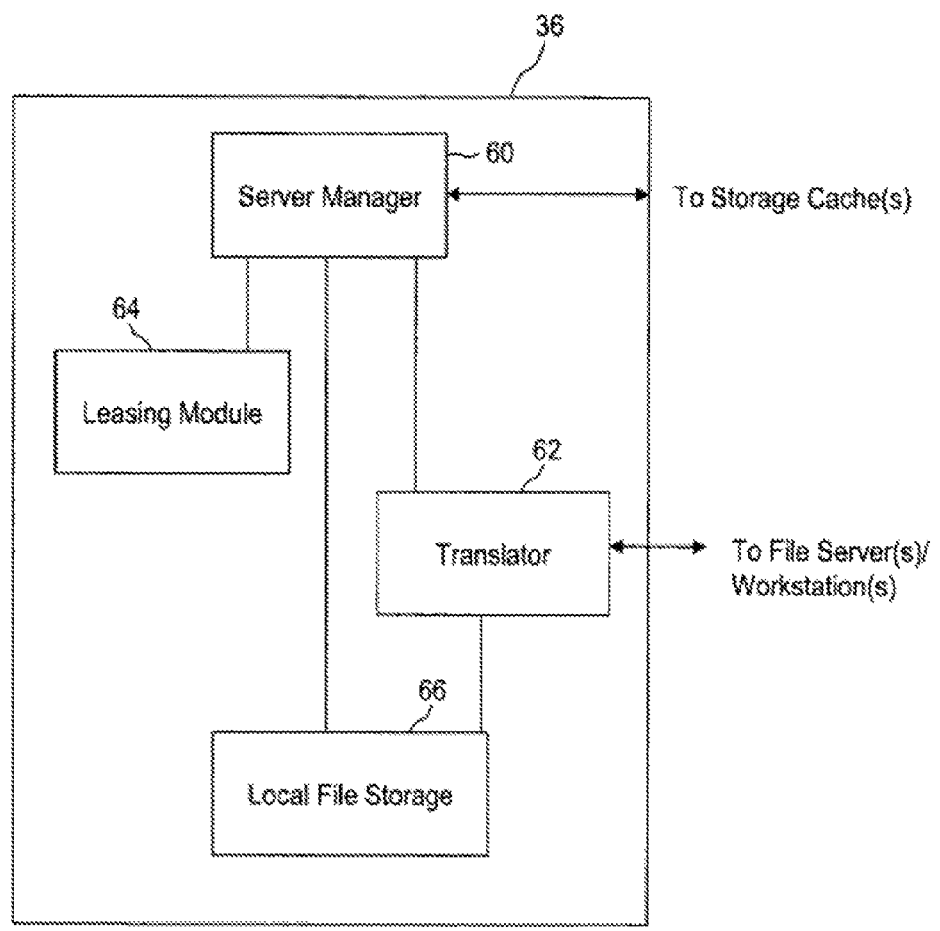
FIG. 4 is a block diagram showing the functional components of a CS appliance (or server), which might be used in some embodiments of the present invention.

FIG. 4 is a particular embodiment of the cache server (or CS appliance), in accordance with the present invention. The cache server manages shared access to data files stored in the file server by multiple storage caches, such as the caches 30A and 30B, and also by workstations, such as the workstations 22E and 22F of the data center 20, which are not associated with a storage cache. In some embodiments, the cache server might be a thin appliance having an architecture that makes it compatible and easily integrated with an existing distributed file system, such as NAS and SAN (Storage Area Network), implemented at a remote computer system and a data center computer system. See U.S. Pat. No. 6,826,580.

Referring to FIG. 4, the cache server 36 includes the modules of a server manager 60, a translator 62, a leasing module 64, and a local file storage 66. The server manager 60 is coupled to the translator 62, the leasing module 64 and the storage 66 and also is coupled to storage caches, such as the storage caches 30A and 30B, via the gateway 26C and the network 28. The translator 62 is coupled to the storage 66 and is coupled to a file server of an associated data center computer system via an Ethernet connection. The translator 62 temporarily stores at the storage 66 copies of data files stored at and obtained from the file server 38, and performs processing using the stored data files and update data received from a storage cache to generate a replacement, updated data file. The translator 62 also replaces a data file stored in the file server 38 with the replacement data file. In addition, the translator 62 can supply to a workstation associated with the central system, such as the workstations 22D and 22E, a copy of a data file stored at the file server 38 only for viewing purposes in accordance with the leasing protocol.

In a particular embodiment, the translator 62, like the translator 52, can generate a checksum representative of a first data file and determine the difference between another data file and the first data file using the checksum. In addition, the leasing module 64, through interactions with the storage caches included in the system 12, determines whether a request for access to a data file from a workstation associated with a specific storage cache should be granted or denied.

It is to be understood that each of the modules of each of the storage caches 30 and the cache server 36, which perform data processing operations in accordance with the present invention, constitutes a software module or, alternatively, a hardware module or a combined hardware/software module. In addition, each of the modules suitably contains a memory storage area, such as RAM, for storage of data and instructions for performing processing operations in accordance with the present invention. Alternatively, instructions for performing processing operations can be stored in hardware in one or more of the modules. Further, it is to be understood that, in some embodiments, the modules within each of the cache server 36 and the storage caches 30 can be combined, as suitable, into composite modules, and that the cache server and storage caches can be combined into a single appliance which can provide both caching for a workstation and real time updating of the data files stored at a file server of a central data center computer system.

In accordance with the present invention, the storage caches and the cache server of the storage caching system 12 provide that a data file stored in a file server of a data center, and available for distribution to authorized workstations via a conventional distributed file system, can be accessed for read or write purposes by the workstations, that the workstations experience a minimum of latency when accessing the file, and that the cached data file supplied to a workstation in response to an access request corresponds to a real time version of the data file. A storage cache of the system 12 stores in the storage 56 only a current version of the cached data file corresponding to the data file that was the subject of an access request, where the single cached data file incorporates all of the data file modifications entered by a workstation associated with the storage cache while the file was accessed by the workstation.

File update data associated with the cached data file is automatically, and preferably at predetermined intervals, generated and then transmitted (flushed) to the cache server. Most preferably, the file update data is flushed with sufficient frequency to provide that a real time, updated version of the data file is stored at the file server and can be used by the cache server to respond to an access request from another storage cache or a workstation not associated with a storage cache. In a particular embodiment, the local storage 56 of the storage cache includes only cached data files corresponding to recently accessed data files.

B. System Architecture for EFG Appliance (or Server) and CS Appliance (or Server)

Figure 5:
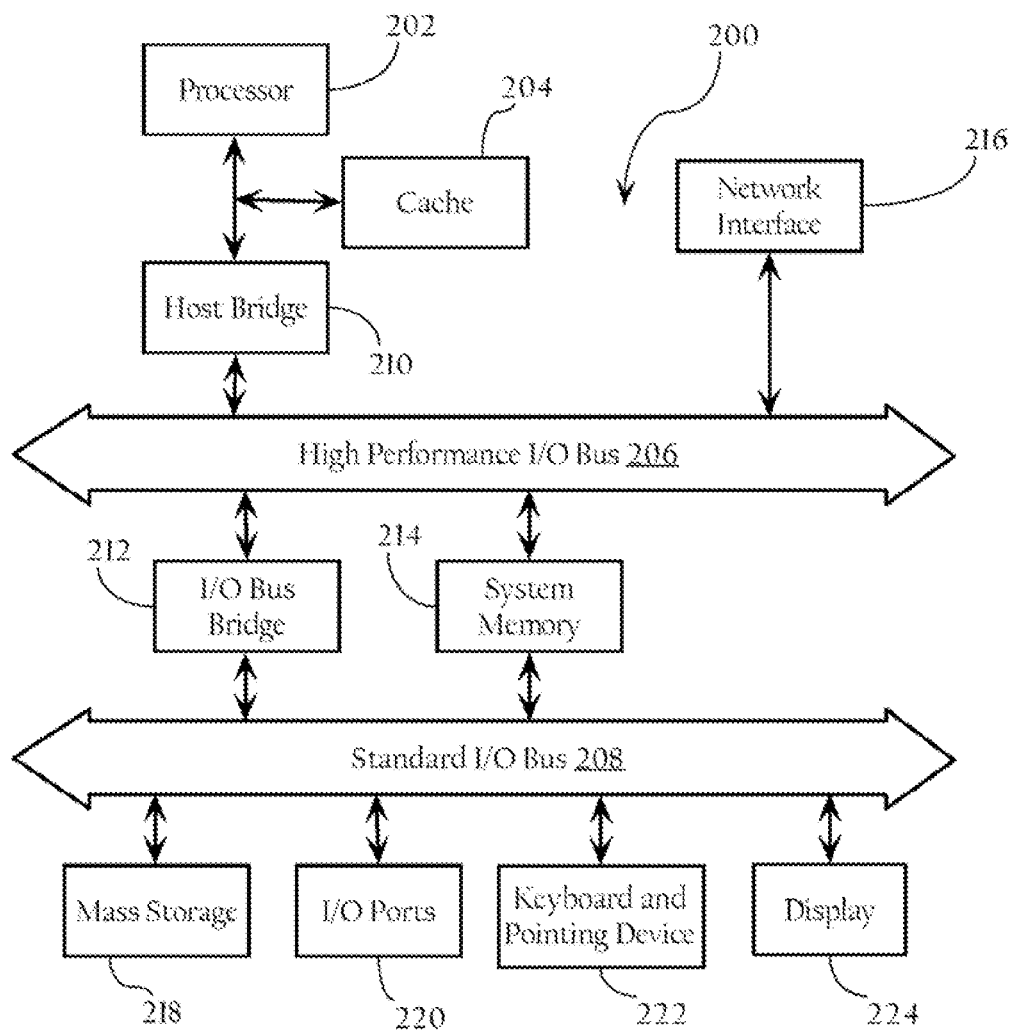
FIG. 5 is a diagram showing the high-level system architecture for an EFG appliance (or server) or a CS appliance (or server), which might be used with an embodiment of the present invention.

FIG. 5 illustrates, for didactic purposes, a hardware system 200, which might be a part of an EFG appliance (or server) or a CS appliance (or server), in particular embodiments. Typically, an appliance includes an off-the-shelf computer and operating system, but the appliance vendor has designed the computer's box and user interface so that the user cannot access anything on the computer, except for an application interface. Since the underlying computing architecture is locked down and essentially invisible, it becomes difficult to discern that the device really functions on top of general purpose hardware and operating system software. Linux is commonly used as the operating system for such appliances, though other operating systems, such as Windows-based operating systems, are also used. Alternatively, as suggested elsewhere, some embodiments employ an EFG server rather than an EFG appliance and in those embodiments the underlying computer architecture is not locked down. The same is also true of embodiments that employ a CS server, rather than a CS appliance.

In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures, and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Linux operating system. However, the present invention may be used with other suitable operating systems, such as the Windows® 95/98/NT/XP operating system, available from Microsoft Corporation of Redmond, Wash., the Apple Macintosh Operating System, available from Apple Computer Inc. of Cupertino, Calif., UNIX operating systems, and the like.

C. Processes for Viewing File Information

Figure 6:
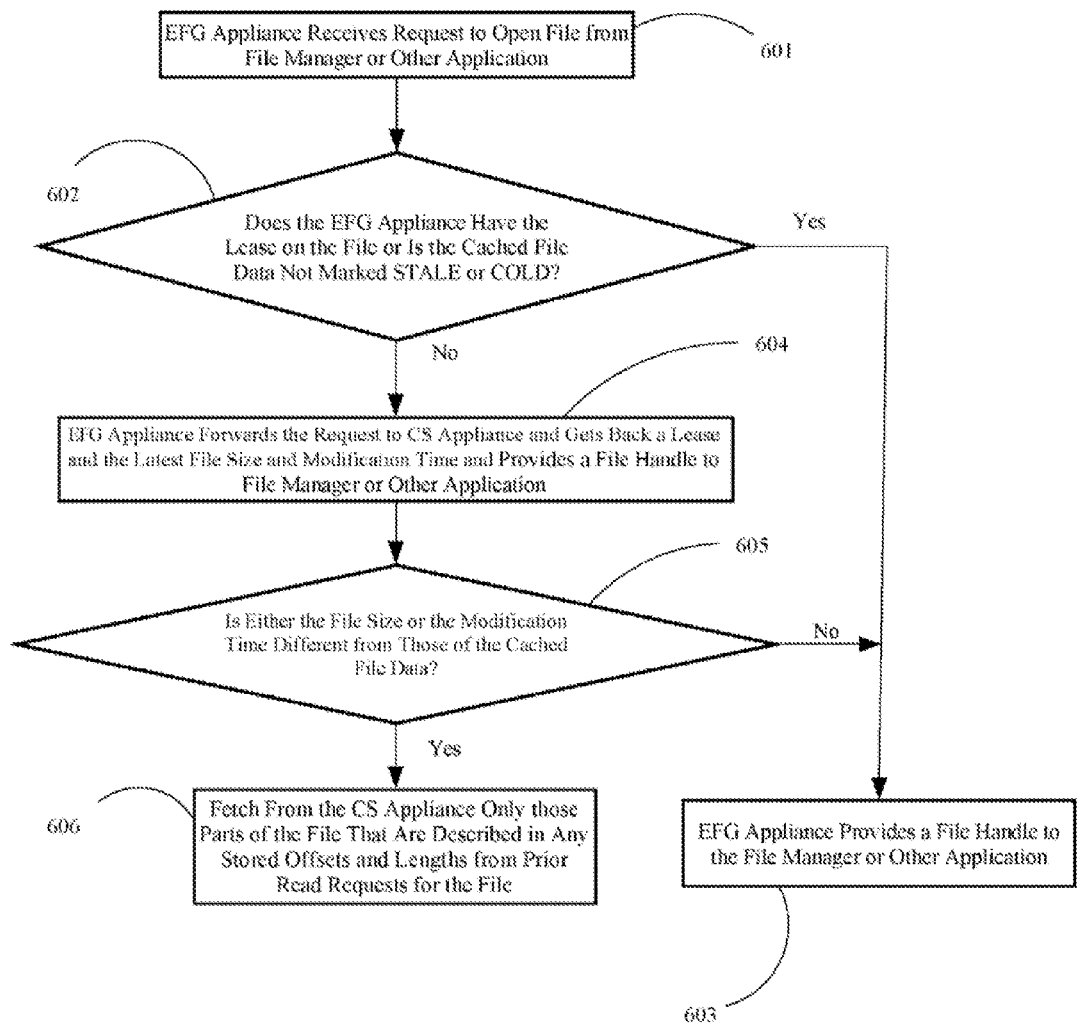
FIG. 6 is a diagram showing a flowchart of a process for opening a file with stored offsets and lengths from prior read requests, which process might be used with an embodiment of the present invention.

FIG. 6 is a flowchart of a process for opening a file with stored offsets and lengths from prior read requests, which process might be used with an embodiment of the present invention. In the first step 601, an EFG appliance (or server) receives a request to open a particular file from a file manager or other application which might open and access one or more files to provide previews of file information, e.g., from a header or thumbnail section. In step 602, the EFG appliance checks to see if it has the lease on the file or whether the file data in the cache is not marked STALE or COLD. If either the EFG has the lease or the file data is not marked STALE or COLD, the EFG appliance proceeds to step 603 and returns a handle for the cached file to the file manager or other application. Otherwise, in step 604, the EFG appliance forwards the request to the CS appliance (or server), gets back a lease and the latest size and modification time for the file, and then provides a file handle for the file to the file manager or other application. In step 605, the process checks to see whether there is a difference in either the file size or the modification time between the EFG appliance's cached file data and the file data sent by the CS appliance. If not, the process goes to step 603 and returns a file handle for the cached file to the file manager or other application. However, if either the file size or modification time is different, the EFG appliance asynchronously fetches from the CS appliance only those parts of the file that are described in any stored offsets and lengths from prior read requests for the file, in step 606. The EFG appliance does not fetch the entire file, during an open operation.

Figure 7:
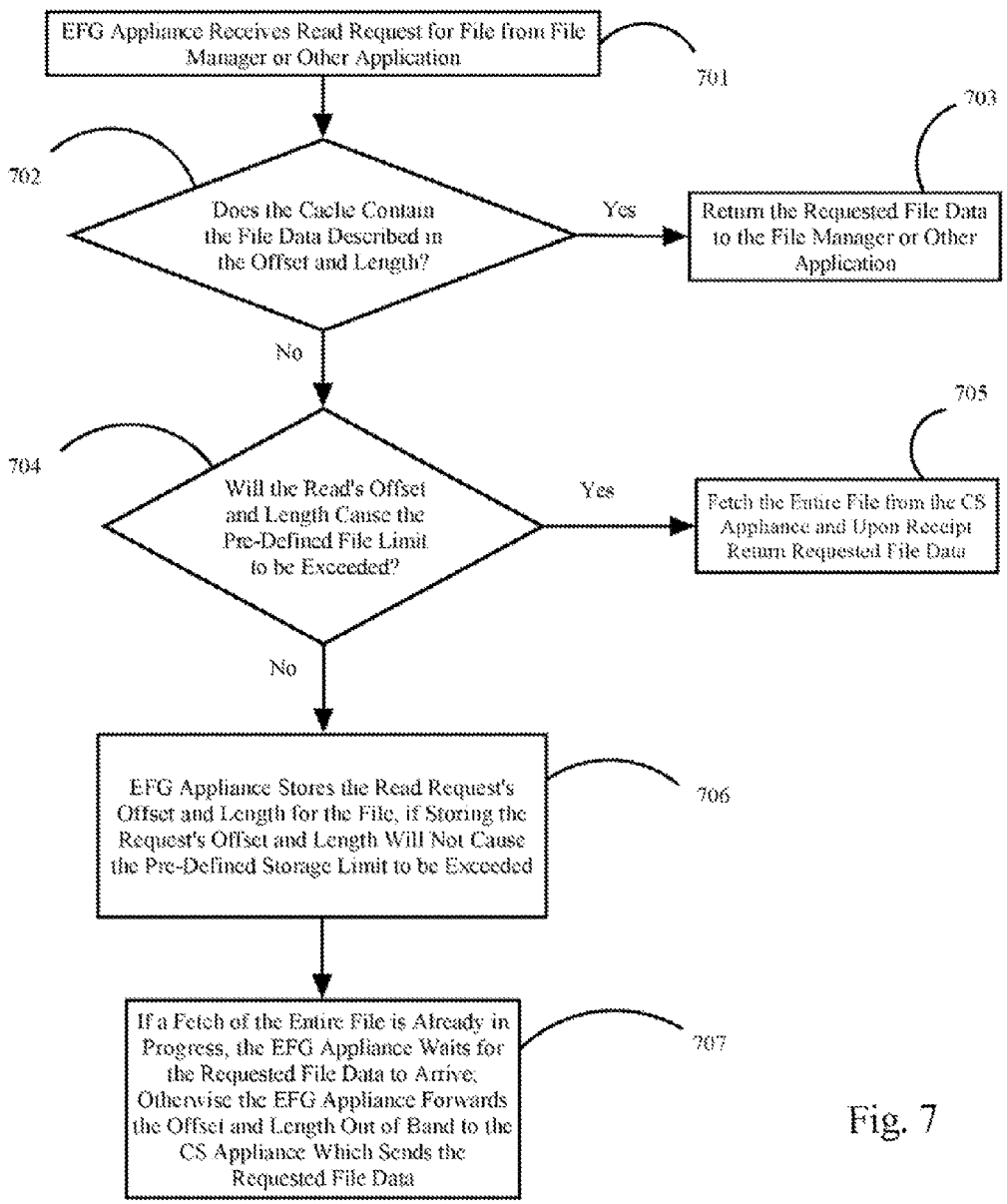
FIG. 7 is a diagram showing a flowchart of a process for reading a file and storing the read request's offset and length, which process might be used with an embodiment of the present invention.

FIG. 7 is a flowchart of a process for reading a file and storing the read request's offset and length, which process might be used with an embodiment of the present invention. In step 701, the EFG appliance receives a request to read a particular file from a file manager or other application. In step 702, the EFG appliance checks to see whether the cache already contains the file data described in the read request's offset and length. If so, the EFG appliance returns the requested file data to the file manager or other application, in step 703. If the requested file data is not cached, the EFG appliance determines whether the requested read's offset and length will cause a predefined file limit to be exceeded, in step 704. If so, the EFG appliance fetches the entire file asynchronously from the CS appliance, in step 705, and upon receipt of the file returns the requested file data to the file manager or other appliance; otherwise, the EFG appliance stores the read request's offset and length for the file, in step 706, if storing the request's offset and length will not cause a predefined storage limit to be exceeded. Then the process goes to step 707, where the EFG appliance waits for the requested file data to arrive, if a fetch of the entire file is already in progress; otherwise, the EFG appliance forwards the offset and length out of band to the CS appliance which sends the requested file data.

In step 704, the process employs a predefined file limit. Particular embodiments define this limit so that the process will tend to store offsets and lengths for read requests that pertain to information in file headers, preview sections, etc. Therefore, a read request's offset and length might not be stored if a specified percentage of the entire file data for that file, e.g., 50%, would be exceeded by the sum of the requested read's offset and length and all previous offsets and lengths stored for the file.

Similarly, in step 706, the process employs a predefined storage limit, which one might think of as a limit on the maximum number of differing read requests for the file. Particular embodiments define this limit so that a read request's offset and length might not be stored if a specified number of bytes would be exceeded by the sum of the bytes needed to store the read request's offset and length and the bytes needed to store all previous storage offsets and lengths for this file. When storing a read request's offset and length, the process might store them as an extended attribute of a file or as a separate stream of data.

Figure 8:
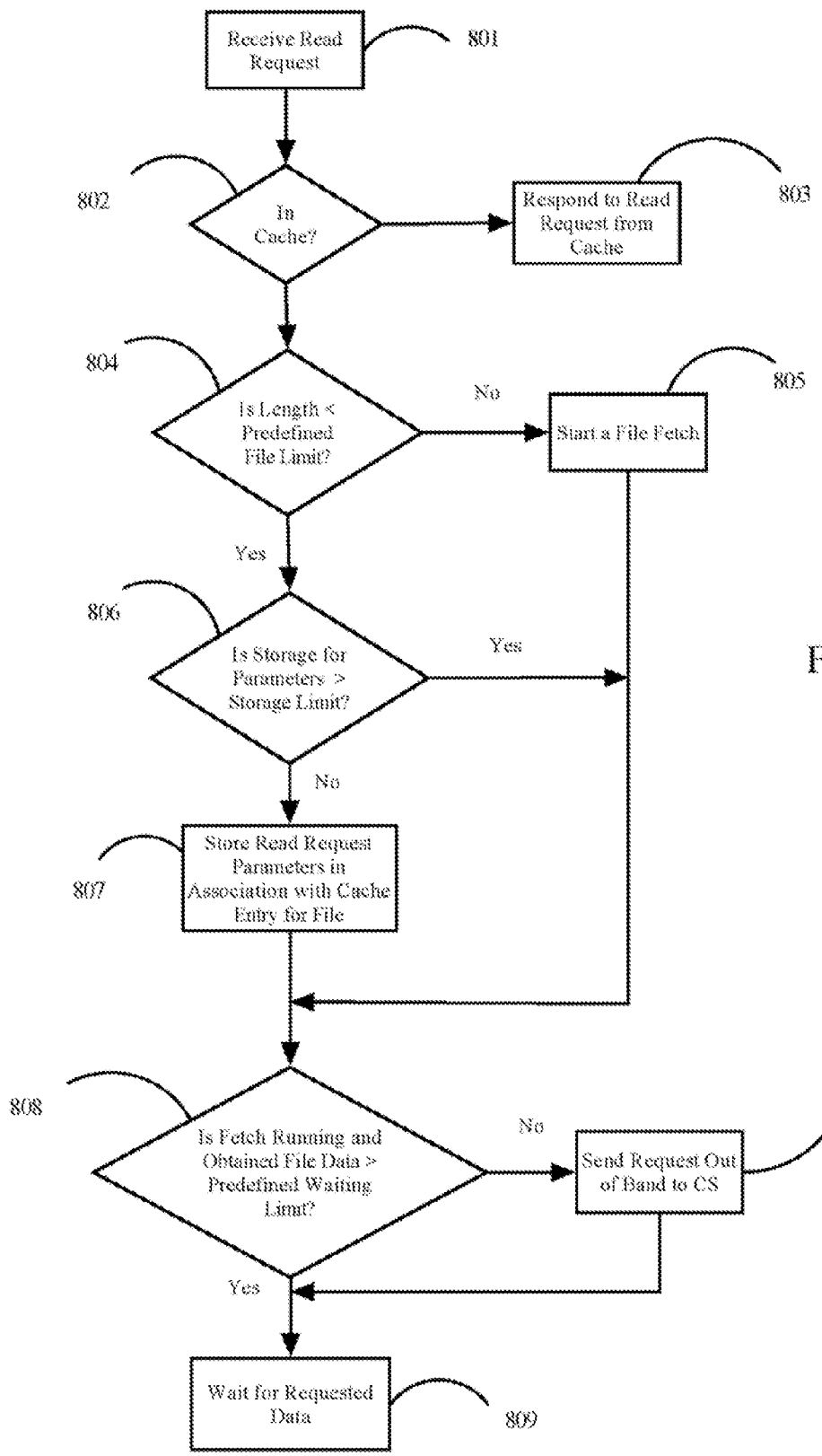
FIG. 8 is a diagram showing a flowchart of an alternative process for reading a file and storing the read request's parameters, which process might be used with an embodiment of the present invention.

FIG. 8 shows an alternative embodiment of the process for handling a read request, which process uses a different predefined file limit. In the first step 801, the process receives a read request and then determines, in step 802, whether the requested file data is in cache. If so, the process responds to the read request from the cache, in step 803. If the requested file data is not in cache, the process goes to step 804 and determines whether the length of the file data requested is less than a predefined file limit that is based on the size of the file, e.g., less than 5% of the file. Note that this predefined file limit differs from the predefined file limit described above, which was based in part upon the previous stored read requests for the file. If the length of the file data requested is not less than the predefined file limit, the process starts a file fetch from the file server, in step 805. Otherwise, the process goes to step 806 and determines whether storage of the parameters (e.g., offset and length) would exceed a predefined storage limit, as was described above. If so, the process jumps to step 808, which will be described below; otherwise the process goes to step 807 and stores the read request's parameters in association with the cache entry for the file. In step 808, the process determines whether a fetch is already running and whether the file data obtained so far in the fetch exceed a predefined limit so that it makes sense to wait for the fetch to complete. If the file data obtained so far exceeds such a waiting limit, the process proceeds to step 809 and waits for the fetch to complete before responding to the read request. Otherwise, the process proceeds to step 810 and sends a request for the file data, including its parameters, out of band to the CS appliance, before going to step 809.

Figure 9:
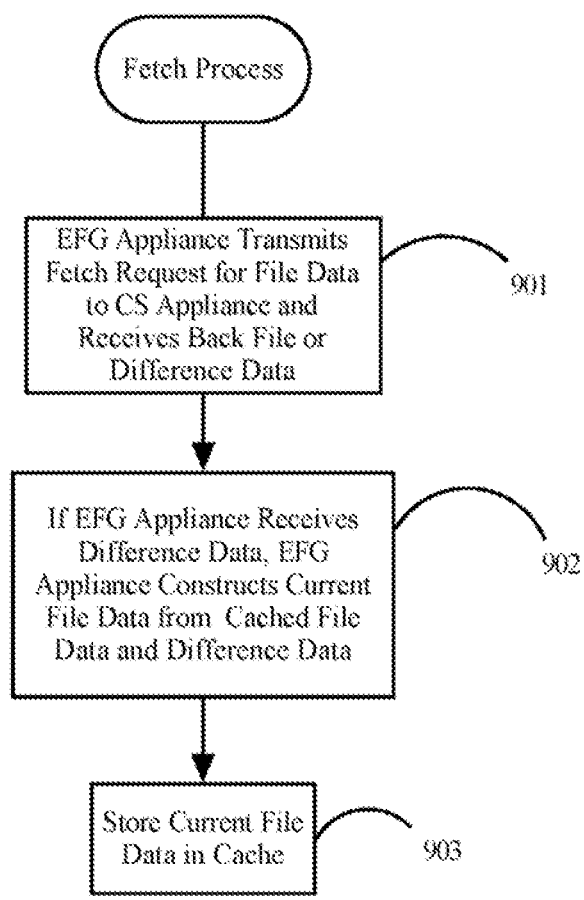
FIG. 9 is a diagram showing a flowchart of a process for fetching file data, which process might be used with an embodiment of the present invention.

As noted in step 606 of FIG. 6, the process might fetch file data described in prior read requests, upon the receipt of an open request. And as noted in step 705 of FIG. 7, the process might fetch an entire file, upon receipt of a read request. FIG. 9 is a flowchart of a process for fetching file data, which process might be used with an embodiment of the present invention. In step 901, the EFG appliance transmits the fetch request for file data to the CS appliance and receives back either the requested file or difference data. If the EFG appliance receives back difference data, the EFG appliance constructs current file data from the difference data and cached file data, in step 902. Then in step 903, the EFG appliance stores the current file data in its connected cache.

Figure 10:
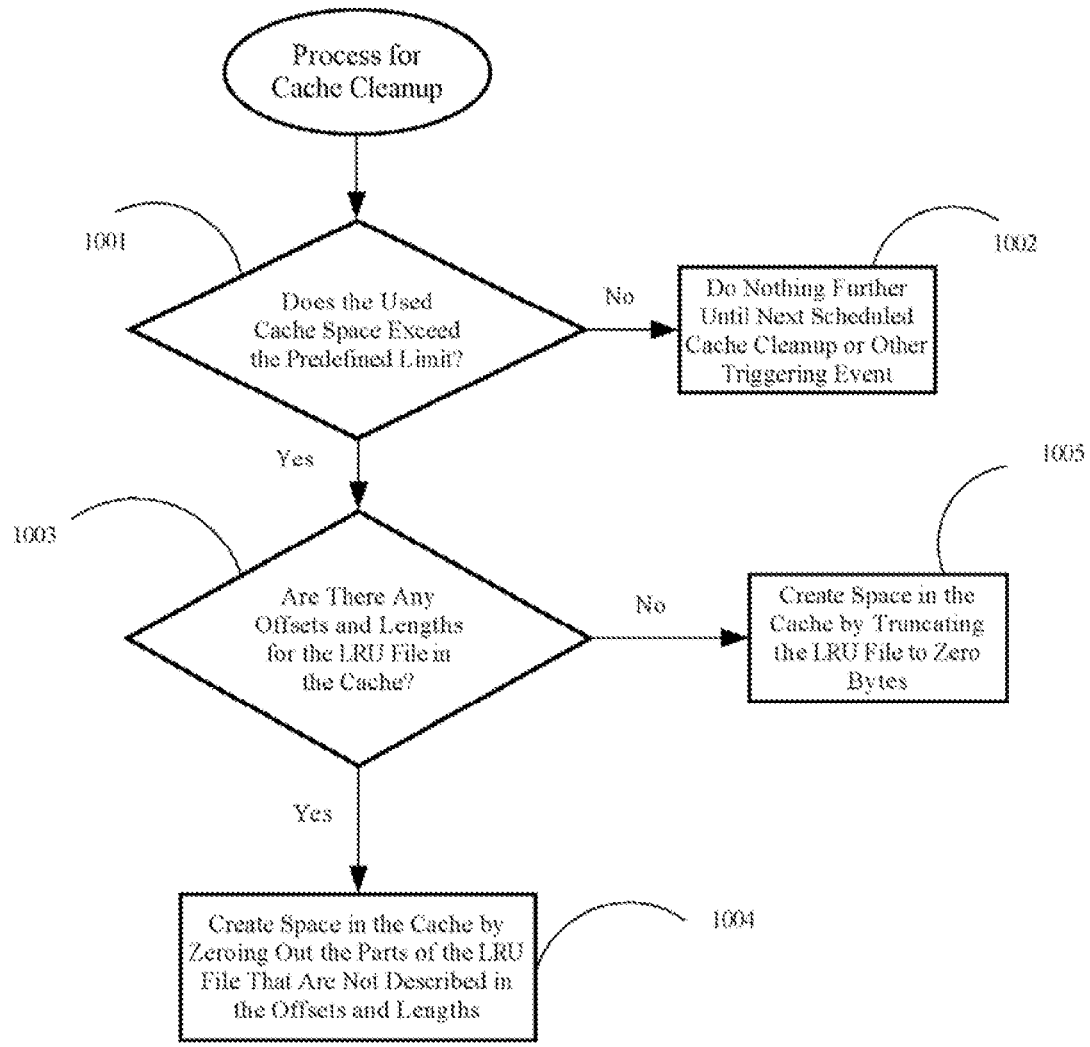
FIG. 10 is a diagram showing a flowchart of a process which might be used for cache cleanup with an embodiment of the present invention.

FIG. 10 is a flowchart of a process which might be used with an embodiment of the present invention during cache cleanup. Cache cleanup involves making space available in the EFG appliance's cache and might be triggered when some predefined amount of cache space is used, e.g., if the cache space used exceeds 95% of total cache space. Typically, this predefined amount is configurable by the user and might be a default value. Further, in some embodiments, a file system module might block further writes to the cache, if the cache space used exceeds 99%.

In the first step 1001 of the process shown in FIG. 1, the EFG appliance determines whether the used cache space exceeds a predefined limit. If the limit is not exceeded, the EFG appliance goes to step 1002 and does nothing further until the next scheduled cache cleanup or other triggering event for cache cleanup. Otherwise, if the limit is exceeded, the EFG appliance determines whether the least-recently-used (LRU) file contains any data for which there are stored offsets and lengths, in step 1003. If such offsets and lengths exist, the EFG appliance preserves their corresponding data by zeroing out only the parts of the LRU file that are not described by the offsets and lengths, in step 1004, and the file will be treated as a sparse file. If such offsets and lengths do no exist for the LRU file, step 1005 of the process will truncate the LRU file to zero bytes and again the file will be treated as a sparse file.

Particular embodiments of the above-described algorithms might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many other possible orderings of the steps in the processes described above and many other possible divisions of those steps between the EFG appliance (or server) and the CS appliance (or server). Likewise, embodiments of the invention might be used with many possible types of networks, in addition to WANs. As a result, the invention is not limited to the specific examples and illustrations discussed above, but only by the following claims and their equivalents.

What is claimed is:

1. A computer-implemented method, comprising:
   receiving, at a network device, a request from a remote client application to open a file stored on a file server, wherein the network device and the file server are connected by a network;
   accessing, in response to the request, a cache to select one or more data segments of the file to pre-fetch from the file server, wherein each of the one or more data segments are identified by an offset position in the file and a length of the data segment;
   conditionally pre-fetching the selected data segments from the file on the file server, wherein:
      the selected data segments that are pre-fetched are based on previous requests to read identified data segments of the file, one or more offset positions and lengths of which are stored in the cache in association with a cached version of the file; and
      the pre-fetched, selected data segments only include data segments described by the one or more offset positions and lengths of previous requests to read identified data segments of the file;
   storing the pre-fetched, selected data segments into the cache;
   after pre-fetching and caching the selected data segments, receiving, from the remote client application, a request to read data from the file, wherein the request comprises an offset position in the file and a length of the data segment to be read;
   accessing the requested data segment in the cache if the cache contains the data segment described in the one or more parameters;
   fetching the requested data segment from the file on the file server, if the cache does not contain the data segment described in the parameters;
   providing the requested data segment to the remote client application in response to the read request; and
   conditionally storing, in the cache, the offset position in the file and the length of the data segment of the request to read the data segment from the file in association with the cached version of the file based one or more predefined storage limits.

2. The method of claim 1, wherein the conditional pre-fetching does not occur if the network device has a lease on the file stored on the file server or if the file data in the cache is known to be current with the file server's file.

3. The method of claim 1, wherein the entire file is fetched from the file server if the request to read would cause a predefined file limit to be exceeded.

4. The method of claim 3, wherein the predefined file limit would be exceeded if a specified percentage of the entire file's length would be exceeded by the sum of the read request's offset position and length and all previously stored offset positions and lengths for the file.

5. The method of claim 3, wherein the predefined file limit would be exceeded if a specified percentage of the entire file's length would be exceeded by the read request's length.

6. The method of claim 1, wherein the predefined storage limit would be exceeded if a specified number of bytes would be exceeded by the sum of the bytes used to store the read request's offset position and length and the bytes used to store all previously stored offset positions and lengths for the file.

7. The method of claim 1, wherein the network is a wide area network.

8. An apparatus comprising logic encoded in one or more tangible storage media for execution and when executed configured to:
   receive, at a network device, a request from a remote client application to open a file stored on a file server, wherein the network device and the file server are connected by a network;
   access a cache to select one or more data segments of the file to pre-fetch from the file server, wherein each of the one or more data segments are identified by an offset position in the file and a length of the data segment;
   conditionally pre-fetch the selected data segments from the file on the file server, wherein:
      the selected data segments that are pre-fetched are based on previous requests to read identified data segments of the file, one or more offset positions and lengths of which are stored in the cache in association with a cached version of the file; and
      the pre-fetched, selected data segments only include data segments described by the one or more offset positions and lengths of previous requests to read identified data segments of the file;
   store the pre-fetched, selected data segments into the cache;
   after pre-fetching and caching the selected data segments, receive, from the remote client application, a request to read data from the file, wherein the request comprises an offset position in the file and a length of the data segment to be read;
   access the requested data segment in the cache if the cache contains the data segment described in the one or more parameters;
   fetch the requested data segment from the file on the file server, if the cache does not contain the data segment described in the parameters;
   provide the requested data segment to the remote client application in response to the read request; and
   conditionally store, in the cache, the offset position in the file and the length of the data segment of the request to read the data segment from the file in association with the cached version of the file based one or more predefined storage limits.

9. The apparatus of claim 8, wherein the conditional pre-fetching does not occur if the network device has a lease on the file stored on the file server or if the file data in the cache is known to be current with the file server's file.

10. The apparatus of claim 8, wherein the entire file is fetched from the file server if the request to read would cause a predefined file limit to be exceeded.

11. The apparatus of claim 10, wherein the predefined file limit would be exceeded if a specified percentage of the entire file's length would be exceeded by the sum of the read request's offset position and length and all previously stored offset positions and lengths for the file.

12. The apparatus of claim 10, wherein the predefined file limit would be exceeded if a specified percentage of the entire file's length would be exceeded by the read request's length.

13. The apparatus of claim 8, wherein the predefined storage limit would be exceeded if a specified number of bytes would be exceeded by the sum of the bytes used to store the read request's offset position and length and the bytes used to store all previously stored offset positions and lengths for the file.

14. The apparatus of claim 8, wherein the apparatus is configured to be resident on a wide area network.

15. At least one non-transitory medium, the medium comprising instructions that, when loaded and executed by a processor, configure the processor to:
receive, at a network device, a request from a remote client application to open a file stored on a file server, wherein the network device and the file server are connected by a network;
access a cache to select one or more data segments of the file to pre-fetch from the file server, wherein each of the one or more data segments are identified by an offset position in the file and a length of the data segment;
conditionally pre-fetch the selected data segments from the file on the file server, wherein:
the selected data segments that are pre-fetched are based on previous requests to read identified data segments of the file, one or more offset positions and lengths of which are stored in the cache in association with a cached version of the file; and
the pre-fetched, selected data segments only include data segments described by the one or more offset positions and lengths of previous requests to read identified data segments of the file;
store the pre-fetched, selected data segments into the cache;
after pre-fetching and caching the selected data segments, receive, from the remote client application, a request to read data from the file, wherein the request comprises an offset position in the file and a length of the data segment to be read;
access the requested data segment in the cache if the cache contains the data segment described in the one or more parameters;
fetch the requested data segment from the file on the file server, if the cache does not contain the data segment described in the parameters;
provide the requested data segment to the remote client application in response to the read request; and
conditionally store, in the cache, the offset position in the file and the length of the data segment of the request to read the data segment from the file in association with the cached version of the file based one or more predefined storage limits.

16. The medium of claim 15, wherein the conditional pre-fetching does not occur if the network device has a lease on the file stored on the file server or if the file data in the cache is known to be current with the file server's file.

17. The medium of claim 15, wherein the entire file is fetched from the file server if the request to read would cause a predefined file limit to be exceeded.

18. The medium of claim 17, wherein the predefined file limit would be exceeded if a specified percentage of the entire file's length would be exceeded by the sum of the read request's offset position and length and all previously stored offset positions and lengths for the file.

19. The medium of claim 17, wherein the predefined file limit would be exceeded if a specified percentage of the entire file's length would be exceeded by the read request's length.

20. The medium of claim 15, wherein the predefined storage limit would be exceeded if a specified number of bytes would be exceeded by the sum of the bytes used to store the read request's offset position and length and the bytes used to store all previously stored offset positions and lengths for the file.

21. The medium of claim 15, wherein the network is a wide area network.

* * * * *